United States Patent [19]

Beaudet et al.

[11] Patent Number: 4,554,558

[45] Date of Patent: Nov. 19, 1985

[54] FLUID JET PRINT HEAD

[75] Inventors: William R. Beaudet, Melbourne, Fla.; Mark A. Culpepper, Plano; David H. Rester, Dallas, both of Tex.

[73] Assignee: The Mead Corporation, Dayton, Ohio

[21] Appl. No.: 630,783

[22] Filed: Jul. 16, 1984 (Under 37 CFR 1.47)

Related U.S. Application Data

[63] Continuation-in-part of Ser. No. 496,329, May 19, 1983, abandoned.

[51] Int. Cl.[4] .......... G01P 15/18

[52] U.S. Cl. .......... 346/75; 346/1.1; 346/140 R

[58] Field of Search .......... 346/140 PD, 140 IJ, 346/75, 1.1; 400/126; 310/345, 316, 317, 318, 367, 368, 369; 101/365, 366; 239/63, 337, 341

[56] References Cited

U.S. PATENT DOCUMENTS

| | | | |
|---|---|---|---|
| 2,716,708 | 8/1955 | Bradfield | 310/9.6 |
| 3,146,415 | 8/1964 | Albsmeier et al. | 333/72 |
| 3,185,943 | 5/1965 | Honda et al. | 333/72 |
| 3,245,012 | 4/1966 | Schofer | 333/72 |
| 3,356,850 | 12/1967 | Fleming-Williams | 250/211 |
| 3,470,394 | 9/1969 | Cook, Jr. | 310/8.0 |
| 3,718,898 | 2/1973 | Cook et al. | 340/10 |
| 3,739,393 | 6/1973 | Lyon et al. | 346/1 |
| 3,854,060 | 12/1974 | Cook | 310/9.6 |
| 3,939,467 | 2/1976 | Cook et al. | 340/8 R |
| 3,964,014 | 6/1976 | Tehon | 340/9 |
| 4,047,130 | 9/1977 | Lim et al. | 310/367 |
| 4,095,232 | 6/1978 | Cha | 346/75 |
| 4,138,687 | 2/1979 | Cha et al. | 346/75 |
| 4,188,635 | 2/1980 | Giordano et al. | 346/75 |
| 4,198,643 | 4/1980 | Cha et al. | 346/75 |
| 4,228,440 | 10/1980 | Horike et al. | 310/317 |
| 4,243,995 | 1/1981 | Wright et al. | 346/140 R |
| 4,245,227 | 1/1981 | Krause | 346/75 |
| 4,284,993 | 8/1981 | Kakeno | 346/140 R |
| 4,303,927 | 12/1981 | Tsao | 346/140 R |
| 4,310,957 | 1/1982 | Sachs | 310/368 |
| 4,354,194 | 10/1982 | Barteck | 346/75 |
| 4,375,066 | 2/1983 | Herd | 346/140 |
| 4,498,089 | 2/1985 | Scardovi | 346/140 PD |
| 4,502,054 | 2/1985 | Brescia et al. | 346/140 PD |

FOREIGN PATENT DOCUMENTS

| | | | |
|---|---|---|---|
| 54-8993 | 1/1979 | Japan | 346/140 R |
| 2094233 | 1/1982 | United Kingdom | 346/140 R |

*Primary Examiner*—E. A. Goldberg
*Assistant Examiner*—A. Evans
*Attorney, Agent, or Firm*—Biebel, French & Nauman

[57] ABSTRACT

A fluid jet print head for producing a plurality of jet drop streams of fluid includes a manifold defining an elongated cavity and an orifice plate defining a plurality of orifices, arranged in at least one row, which communicate with the cavity. A transducer arrangement, including a piezoelectric means, is mounted in the cavity and is spaced from the orifice plate so as to define a fluid reservoir therebetween. The transducer arrangement further includes acoustic isolation material which surrounds the piezoelectric means and supports the piezoelectric means in the cavity. The transducer means, when electrically excited, produces pressure waves of substantially uniform wave front which travel through the fluid in the reservoir toward the orifice plate and cause break up into jet drop streams of fluid flowing through the orifices. The piezoelectric means may include an elongated transducer which defines a plurality of slots extending alternately from opposite sides of the transducer partially therethrough. Each of the slots is substantially perpendicular to the row or rows of orifices. The slots prevent wave propagation along the transducer. Alternatively, the piezoelectric means may include a plurality of transducers arranged in at least one transducer row extending in a direction substantially parallel to the row of orifices.

39 Claims, 14 Drawing Figures

FLUID JET PRINT HEAD

The present application is a continuation-in-part application of U.S. patent application Ser. No. 496,329, filed May 19, 1983 now abandoned.

BACKGROUND OF THE INVENTION

The present application relates to fluid jet print heads and, more particularly, to a stimulation arrangement of the type which produces pressure varicosities in the individual fluid jets, resulting in substantially uniform breakup of the jets into streams of drops.

Ink jet printers, incorporating fluid jet print heads, are known which have an orifice structure defining a plurality of orifices. The orifices receive an electrically conductive recording fluid, such as for example a water-base ink, from a pressurized fluid supply manifold and eject the fluid in one or more rows of parallel streams. As the streams break up into drops, the drops are selectively charged and deflected, with some of the drops being deposited on a print receiving medium and the balance of the drops being caught by an appropriate catcher structure.

Charging of the drops is accomplished by selectively applying charging voltages to charge electrodes positioned near each of the streams. The fluid flowing through each orifice emerges as a fluid filament. Drops break away from the tip of the fluid filament and carry charges related to the voltage of the associated charge electrode at the instant of drop formation. Each drop is then subjected to an electrostatic field which deflects the drop by a distance proportional to the magnitude of the charge which it carries. Drops may thus be deflected to one or more print positions and, when a drop is not to be deposited on the print receiving medium, deflected to an adjacent catcher structure.

With print heads of the type used in ink jet printers, it is necessary to control drop formation since if left to natural stimulating disturbances, the fluid filaments would break up erratically into drops of various sizes at irregular intervals. Such erratic drop formation would prevent proper charging and deflection of the drops. Accordingly, it is customary to apply a stimulating disturbance to all of the fluid streams to produce jets of uniformly sized and regularly spaced drops.

Various types of stimulation arrangements have been suggested. U.S. Pat. No. 3,739,393, issued June 12, 1973, to Lyon et al, discloses an ink jet print head in which the fluid orifices are defined by a thin, relatively flexible orifice plate. A piezoelectric transducer contacts the orifice plate at one end and produces a series of bending waves which travel longitudinally along the plate. Dampers at each end of the orifice plate dampen the traveling waves and prevent wave reflection. The bending waves in the orifice plate produce an oscillatory movement of the orifices which, in turn, causes pressure varicosities in the fluid filaments emerging from the orifices. As a consequence, the fluid filaments break up into relatively uniform jet drop streams.

It will be appreciated that break up of the drop streams is nonsynchronous in a print head employing traveling wave stimulation. The print head, therefore, cannot be operated at its maximum printing resolution since the precise time of drop formation for each stream will be unknown and charge voltages must be supplied to the charge electrodes for sufficient time periods to insure that they result in appropriate charging of at least one drop. As a consequence more than one drop is usually charged in succession and partially charged drops, formed during charge voltage transition periods, are commonly formed.

One solution to these problems is to apply drop stimulating disturbances to all filaments in synchronism. If all of the jets have the same diameter and velocity, and stimulating disturbances are applied to the jets simultaneously, all filaments will generate drops in synchronism. Such synchronized drop generation greatly simplifies the application of charge signals to the charge electrodes, because the timing for each of the jets is precisely the same. Additionally, charge voltage transitions can be timed to occur between drop formations. The number of partially charged drops is therefore substantially reduced. Providing such precise synchronized stimulation to all of the jet drop streams in a long row of streams is not a simple matter, however.

U.S. Pat. No. 4,095,232, issued June 13, 1978, to Cha, discloses a print head in which stimulation is provided by flexing a pressure plate mounted on the opposite side of the fluid manifold from the orifice plate. A plurality of piezoelectric transducers are positioned along the length of the pressure plate on the opposite side thereof from the manifold. The transducers are stimulated in unison so as to produce oscillation of the pressure plate which is in phase along its entire length. This approach requires a substantial amount of mounting structure for the transducers and, additionally, requires that all of the transducers operate in precise synchronization and at substantially the same amplitude. If one or more of the transducers operate slightly off frequency, or at a lower amplitude, it is possible that traveling waves may be produced which move along the pressure plate, causing nonsynchronous drop generation. Additionally, the stimulation amplitude may vary along the length of the print head, producing fluid filaments of differing lengths.

U.S. Pat. No. 4,138,687, issued Feb. 6, 1979, to Cha et al, discloses a print head having an elongated piston mounted in the upper portion of the fluid manifold. A number of piezoelectric transducers are mounted along the length of the piston to produce vertical movement thereof and stimulation of fluid jets. The piston has a plurality of transverse slits along its length which are alternately cut from opposite upper and lower surfaces. The slits are more than one-half of the height of the piston such that there are no horizontal planes through the piston which are not cut by at least some of the slits. These slits minimize wave propagation along the piston which would otherwise cause deterioration of the stimulation process.

It will be appreciated that prior art mounting structures for piezoelectric transducers used in a print head having a stimulation piston or pressure plate arrangement are relatively complicated and add substantially to the cost, size, and weight of the print head. It will be appreciated, also, that multiple transducer stimulators in the prior art have been subject to operating difficulties when the amplitudes of the vibrations produced by the transducers have not been substantially uniform.

Accordingly, it is seen that there is a need for a stimulation arrangement not having the limitations associated with prior art fluid jet stimulation devices.

SUMMARY OF THE INVENTION

A fluid jet print head for producing a plurality of jet drop streams of fluid includes a manifold means defining an elongated cavity therein, and an orifice plate defining a plurality of orifices arranged in at least one row. The orifice plate is mounted on the manifold means such that the orifices communicate with the cavity and the row of orifices extends in a direction generally parallel to the direction of elongation of the cavity. A stimulator means is mounted in the cavity and is spaced from the orifice plate so as to define a fluid reservoir therebetween. The stimulator means includes a plurality of piezoelectric means which, when electrically excited, produce pressure waves of substantially uniform phase front which travel through fluid in the reservoir toward the orifice plate and which cause break up into jet drop streams of fluid flowing through the orifices. The stimulator means further includes acoustic isolation material surrounding the plurality of piezoelectric means and providing a means of supporting the piezoelectric means in the cavity. Wave propagation along the stimulation means in a direction parallel to the row of orifices is thereby prevented. The acoustic isolation material may comprise a polyurethane foam material. Finally, the fluid jet print head includes an electrical signal generator means for electrically exciting the plurality of piezoelectric means. The generator means includes means for providing an alternating drive signal and attenuator means for supplying the alternating drive signal to the piezoelectric means with the amplitude of the drive signal being set for each piezoelectric means. This produces proper break up of the jet drop streams along the length of the print head.

The piezoelectric means may include an elongated transducer defining a plurality of slots, extending alternately from opposite sides of the transducer partially therethrough and being substantially perpendicular to said row of orifices. The stimulator means may further include electrode means in contact with the side of the piezoelectric means adjacent the reservoir and with the opposite side of the piezoelectric means. The print head may further include electrical signal generator means connected to the electrode means, whereby a fluctuating electrical signal is impressed across the piezoelectric means, producing waves of a corresponding frequency in the fluid in the reservoir.

The stimulator means may further include sealing means extending across each slot adjacent the reservoir so as to seal the slots and prevent flow of fluid from the reservoir into the slots. The sealing means may further extend across the surface of said acoustic isolation material on the side thereof adjacent said reservoir, whereby the sealing means prevents fluid in the reservoir from contacting the acoustic isolation material.

The stimulator means may include electrode means mounted on opposing surfaces of the elongated transducer. The opposing surfaces extend along the length of the transducer and are substantially normal to the orifice plate. An electrical signal generator means may be connected between the electrode means, whereby a fluctuating electrical signal is impressed across the piezoelectric means, producing waves of a corresponding frequency in the fluid in the reservoir. The plurality of piezoelectric means may be potted into place in the cavity by the acoustical isolation material. The acoustical isolation material covers the electrode means such that the electrode means are electrically isolated from fluid in the reservoir.

The plurality of piezoelectric means may include a plurality of transducers arranged in at least one transducer row and extending in a direction substantially parallel to the row of orifices. The transducers are uniformly spaced apart and acoustic isolation material surrounds each of the transducers on the sides thereof generally perpendicular to the orifice plate, whereby the transducers are acoustically isolated. The stimulator means may include electrode means in contact with the side of each of the transducers adjacent the reservoir and with the opposite side thereof. Alternatively, the stimulator means may include electrode means mounted on opposing surfaces of each of the transducers, with the opposing surfaces being substantially normal to the orifice plate. The piezoelectric means may include a plurality of transducers arranged in a pair of parallel rows.

The attenuator means may comprise a plurality of capacitors. Each of the capacitors electrically connects the means for providing an alternating drive signal to an associated one of the piezoelectric means.

A method of electrically tuning the stimulator of a fluid jet print head constructed according to the present invention includes the steps of:

(a) applying a drive signal to all of the piezoelectric means, (b) monitoring the fluid filament length of a jet closest to the first of the piezoelectric means while adjusting the current supplied thereto in order to determine the optimum current level to be applied to the first of said piezoelectric means, (c) repeating step (b) for each of the remaining piezoelectric means, and (d) connecting impedances of appropriate amplitudes in series with each of the piezoelectric means such that the piezoelectric means may be driven by a single drive signal source with each of the piezoelectric means receiving its respective optimum current level.

The step of connecting impedances may include the step of connecting a capacitor of a desired impedance in series with each of said piezoelectric means.

Accordingly, it is an object of the present invention to provide a fluid jet print head having a stimulation arrangement including a plurality of piezoelectric means mounted by acoustic isolation material; to provide such a print head in which the plurality of piezoelectric means are defined by an elongated transducer; to provide such a print head in which the transducer defines a plurality of slots extending alternately from opposite sides of the transducer partially therethrough and being substantially perpendicular to the row of orifices; to provide such a print head in which the drive circuitry supplying driving signals to the plurality of piezoelectric means includes means for attenuating the drive signal supplied to each piezoelectric means to optimize operation thereof; to provide a method of determining the attenuation required for each such piezoelectric means and the component values of impedances which, connected in series with the piezoelectric means provide such attenuation; and to provide such a print head in which the sealing material separates the reservoir from the transducer means.

Other objects and advantages of the invention will be apparent from the following description, the accompanying drawings and the appended claims.

DETAILED DESCRIPTION OF THE PREFERRED EMBODIMENTS

Figure 1:
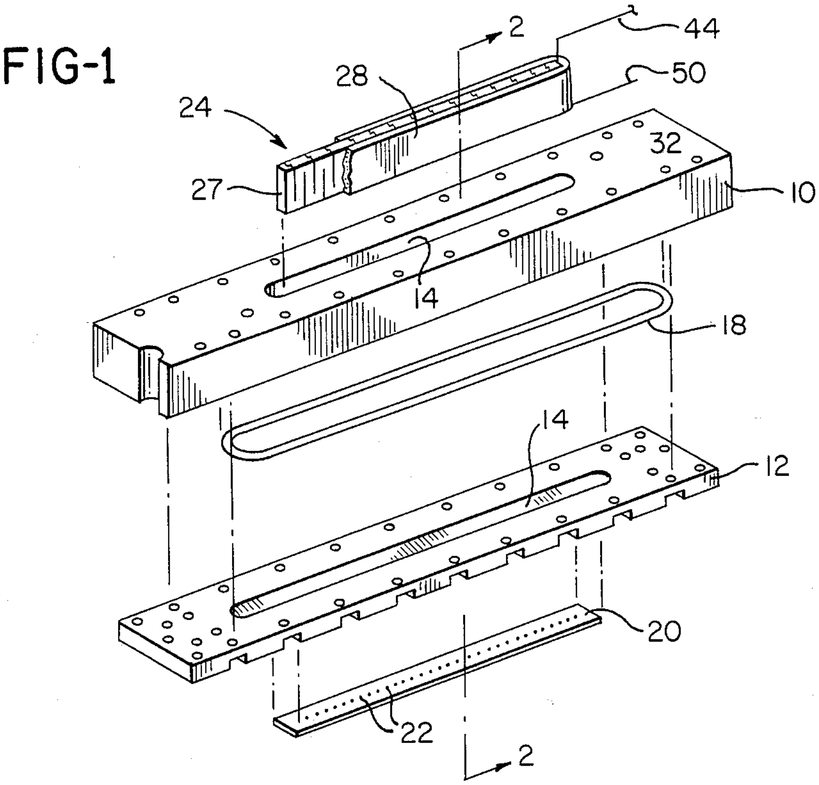
FIG. 1 is an exploded perspective view, illustrating a first embodiment of the present invention.
Figure 2:
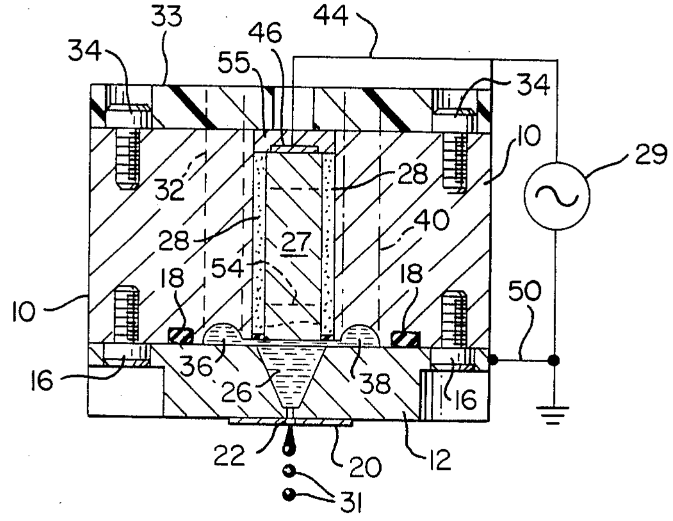
FIG. 2 is a sectional view taken generally along line 2—2 in FIG. 1.

The present invention relates to a fluid jet print head, such as may be utilized in an ink jet printing system for producing a plurality of jet drop streams, and more particularly to a print head including an improved drop stimulation arrangement. As seen in FIGS. 1 and 2, the fluid jet print head has a manifold means, including upper manifold portion 10 and lower manifold portion 12, which defines an elongated cavity 14 therein. Manifold portions 10 and 12 are held together by bolts 16, compressing a sealing ring 18 therebetween which provides a fluid-tight seal.

The print head further includes an orifice plate 20 which defines a plurality of orifices 22 which are arranged in at least one relatively long row. Orifice plate 20 is mounted on the bottom of manifold portion 12 by an adhesive or, alternatively, by soldering or other appropriate means. The orifices 22 communicate with cavity 14 and the row of orifices extends generally parallel to the direction of elongation of the cavity 14.

Figure 3:
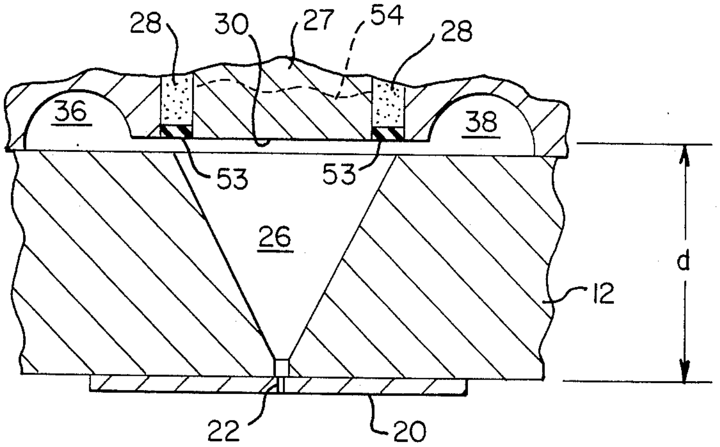
FIG. 3 is an enlarged partial sectional view, similar to FIG. 2.

A stimulator means 24 is mounted in cavity 14 and, as shown in FIGS. 2 and 3, is spaced from orifice plate 20 by a distance d of approximately $\frac{1}{2}$ wavelength of the stimulation waves through the fluid used by the print head. The design, shape, and dimensions of the cavity will be discussed more fully below. The stimulator 24 and the orifice plate 20 define a fluid reservoir 26 therebetween. Stimulator means 24 includes a plurality of piezoelectric means which are defined by elongated transducer 27 and which lengthen and contract vertically when electrically excited with an oscillating signal. The stimulator means further includes acoustic isolation material 28 which surrounds the piezoelectric means and provides a means of supporting the piezoelectric means in the cavity 14.

The oscillatory movement of the bottom surfaces of the piezoelectric means produces pressure waves of substantially uniform phase front in the fluid in the reservoir 26. These waves travel downward through the fluid and are coupled to the fluid filaments flowing through the orifices 22 causing them to break up into jet drop streams. The transducer 27, constructed of a ceramic piezoelectric material, changes dimension when subjected to an appropriate voltage differential. The transducer 27 vibrates vertically in response to an oscillating excitation signal produced by an electrical signal generator 29 at a frequency corresponding to the output frequency of the generator.

As seen in FIG. 2, the fluid filaments break up into a series of relatively uniform, evenly spaced drops 31. As a result of the substantially uniform phase front of the waves in the fluid, the filament stimulation is synchronized and drops in each of the jet drop streams are produced in synchronization. In a known manner, these drops may be electrically charged by means of charge electrodes, adjacent the tips of the fluid filaments, to which charge voltages are applied during the formation of the drops. Since the drops are formed in synchronization, the charge voltages may be applied to the electrodes in synchronization, producing controlled, precise charging of individual drops in the streams. After charging, drops 31 are deflected by an electrical field or fields to a catcher or, alternately, to a print receiving medium, as is known in the art.

Fluid is supplied to the reservoir 26 via fluid supply inlet 32 which, as shown in FIG. 2, extends downward through upper manifold portion 10 and a support plate 33, attached to manifold portion 10 by bolts 34. Inlet 32 terminates in a channel 36 which extends substantially the entire length of the reservoir 26. A similar channel 38 communicates with the reservoir 26 and a fluid outlet 40 and provides a means of removing fluid from the print head or during cross flushing at shutdown.

Figure 4:
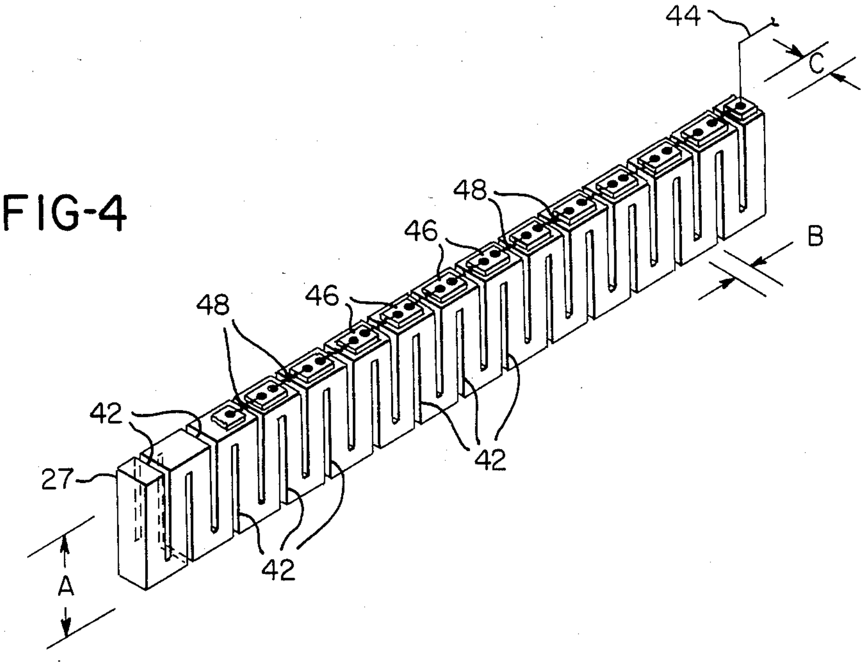
FIG. 4 is a perspective view of the piezoelectric means incorporated in the first embodiment of the invention.

As seen in FIG. 4, the elongated transducer 27 defines a plurality of slots 42 which extend alternately from opposite sides of the transducer partially therethrough so as to define the plurality of piezoelectric means. Each of the slots is substantially perpendicular to the row of orifices when the transducer is positioned in cavity 14, as shown in FIG. 1. Slots 42 may be formed by cutting a block of piezoelectric material, leaving approximately 0.05 inch between the end of the slot and the opposite face of the block. In one transducer constructed according to the present invention, slots cut from the same side were spaced apart by a distance of approximately 0.25 inches. The dimensions of the transducer are discussed more completely below.

Slots 42 reduce substantially the possibility of wave movement or bending along the length of the transducer 27. Additionally, the acoustic isolation material, which may for example by a polyurethane foam material, provides a means of supporting the piezoelectric transducer so that vibrations are not coupled to the manifold portion 10. Thus, unwanted wave transmission through the transducer or associated support structure is minimized, and generally undistorted downward traveling waves are produced in the fluid in reservoir 26.

In order to provide for electrical stimulation of the plurality of piezoelectric means the electrical signal generator 29 is coupled by means of conductor 44 to a plurality of electrodes 46. Each electrode 46 is associated with and provides a means of energizing a respective one of the piezoelectric means, i.e. that section of the transducer defining the particular piezoelectric means. As shown in FIG. 4, the electrodes 46 may be connected in parallel by conductors 48 which bridge the slots 42. These electrodes may be plated onto the piezoelectric material prior to cutting slots 42.

Conductor 50 provides a means of electrically connecting the generator 28 to conductive fluid in reservoir 26 via electrically conductive manifold portion 12. The fluid contacts the surfaces 30 on the bottom of the transducer and effectively acts as a second set of electrodes, opposing electrodes 46. The fluctuating potential difference between electrodes 46 and the fluid contacting the opposite side of the transducer produces the desired fluctuating voltage potential across the transducer, causing the piezoelectric means to vibrate vertically.

As shown in FIGS. 1 and 2, the acoustical isolation material, which is of low density, surrounds the transducer 27, effectively isolating it from manifold portion 10. Further, the material 28 pots the transducer 27 into position in the cavity 14, since it is bonded to both the transducer 27 and the manifold portion 10. A sealing means, such as a room-temperature vulcanized silicone 53, extends across and into slots 42, as indicated at 54, so as to seal the slots 42 and prevent flow of fluid from the reservoir 26 into the slots. The room temperature vulcanized silicone material 53 also covers the acoustic isolation material 28. This prevents the fluid in the reservoir from contacting the acoustic isolation material in the instance where a porous foam is utilized. It should be noted, however, that material 53 does not cover surfaces 30, thereby permitting electrical contact between these surfaces and the fluid. Also provided in cavity 14 is a layer of epoxy 55 which acts as a backing material for the stimulator means while, at the same time, sealing the stimulator transducer 27 and the slots 42 defined therein from atmosphere.

Figure 5:
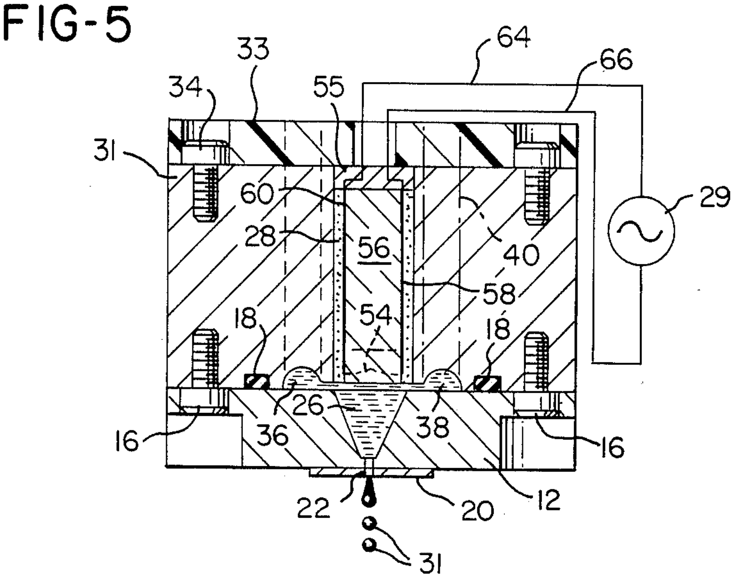
FIG. 5 is a sectional view, similar to FIG. 2, illustrating a second embodiment of the present invention.
Figure 6:
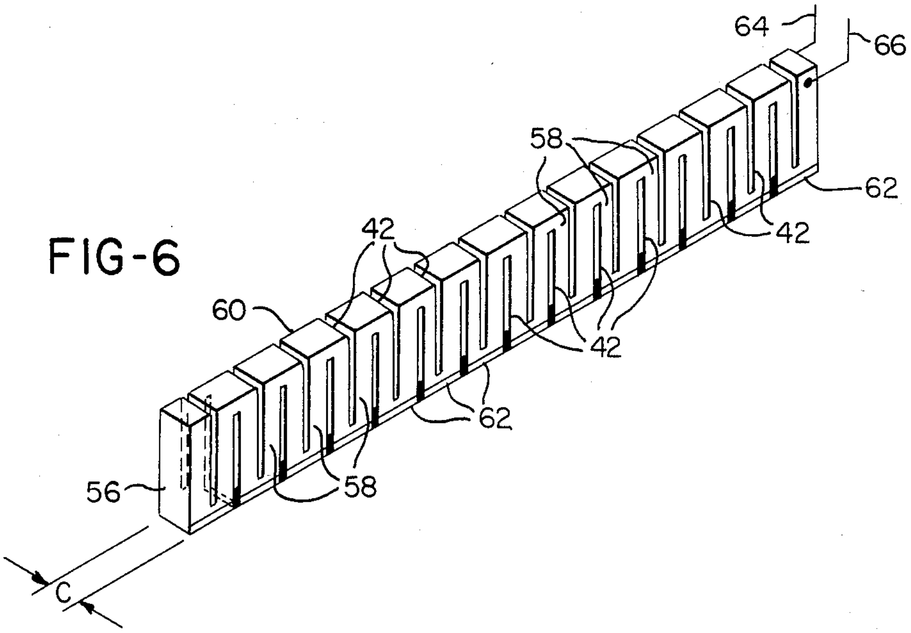
FIG. 6 is a perspective view of the piezoelectric means incorporated in the second embodiment of the invention.

FIGS. 5 and 6 illustrate a second embodiment of the present invention. With the exception of the construction of the stimulator means and the connection of generator 29 thereto, the print head is of the same construction as that illustrated in the embodiment of FIGS. 1-4. As a consequence, corresponding reference numerals have been utilized to indicate identical print head elements in the two embodiments.

In this embodiment, the plurality of piezoelectric means are defined by an elongated transducer 56. Electrically conductive coatings 58 and 60 on opposing surfaces of the elongated transducer 56 provide the electrodes for the piezoelectric means. Since coatings 58 and 60 are electrically continuous along the length of the transducer, the plurality of piezoelectric means are effectively connected in parallel.

As seen in FIG. 5, when the stimulator means is mounted in cavity 14 by acoustic isolation material 28, the opposing surfaces, bearing coatings 58 and 60, extend along the length of the transducer 56 and are generally normal to the orifice plate 20. Coatings 58 and 60 define serpentine electrodes which cover substantially all of the lateral surfaces of piezoelectric transducer 56 except for uncoated area 62 which extends along the lower sides of transducer 56. As may be seen in FIG. 5, acoustical isolation material 28 therefore completely covers electrodes 58 and 60 and prevents any contact of these electrodes by electrically conductive fluid in reservoir 26. This is desirable since silicon material 53 is used to seal the slots 42 but does not cover the entire lower surface of the stimulator means.

Electrical conductors 64 and 66 are electrically connected to generator 29 and provide the necessary excitation signal to electrodes 58 and 60. Transducer 56 is formed of a piezoelectric material of the type which vibrates in a direction transverse to the electrical voltage difference applied thereacross. As a consequence, transducer 56 vibrates vertically and stimulation of drop breakup is provided by waves generated in the fluid in reservoir 26, in the same manner as discussed previously.

The transducer 56 may advantageously be fabricated from a sheet of ceramic piezoelectric material of a thickness equal to the desired width C of the transducer. An electrically conductive coating is formed on opposite faces by plating or other appropriate techniques. Next, the sheet is cut into a strip having the desired length and height for the transducer. Finally, slots 42 are cut from opposite sides of the strip. Uncoated areas 62 may be formed by machining or other techniques, such as etching.

Figure 7:
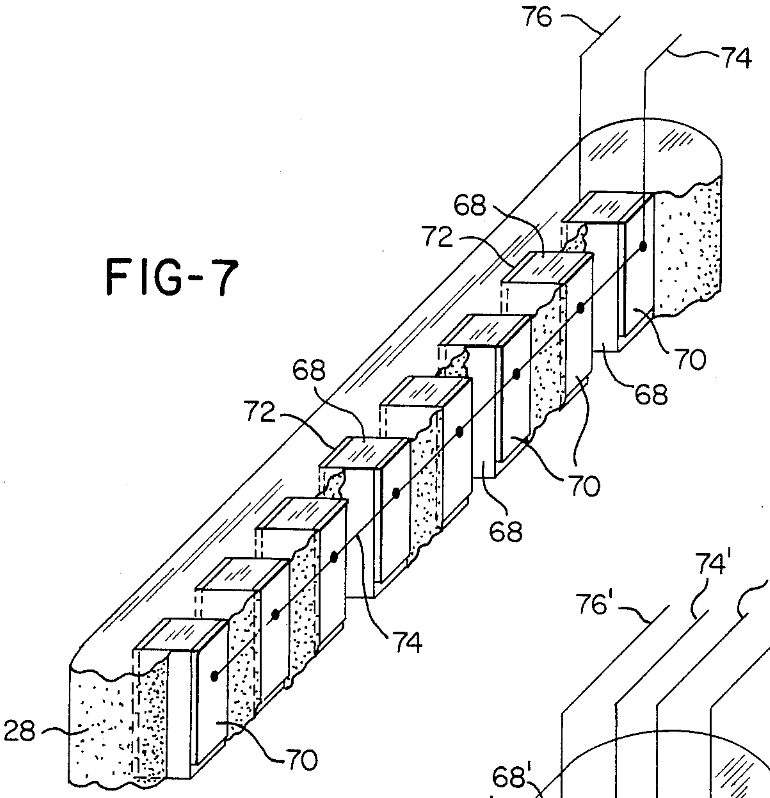
FIG. 7 is a perspective view, with portions broken away, of stimulator means incorporated in a third embodiment of the invention.

FIG. 7 illustrates the piezoelectric means incorporated in a third embodiment of the fluid jet print head. The balance of the print head structure is identical to that shown in FIGS. 1-6, and is therefore omitted. The piezoelectric means include a plurality of transducers 68 which are arranged in at least one transducer row. The transducer row extends in a direction substantially parallel to the row of orifices when the stimulator means is positioned in the print head manifold. The transducers 68 are uniformly spaced apart and are each surrounded by acoustic isolation material 28 on the sides of the transducers which are generally perpendicular to the orifice plate. The acoustical isolation material 28 is bonded to all four side surfaces of the transducers 68 and to the manifold portion 10 which defines the cavity in which the stimulator means is positioned. As a consequence, the acoustical isolation material 28 effectively isolates each of the transducers 68 from the balance of the print head structure and from the other transducers in the row, while providing a means of supporting the transducers in their operating positions.

The stimulator means further includes electrode means, comprising electrodes 70 and 72 which are positioned on opposing surfaces of each of the transducers 68. The opposing surfaces, as illustrated, are substantially normal to the orifice plate when the stimulator means is mounted in the manifold. The electrodes 70 and 72 may comprise thin layers of metal which are plated onto the desired surfaces of the transducers. As illustrated, an electrical conductor 74 extends between and is electrically connected to each of the electrodes 70. Similarly, an electrical conductor 76 extends between and is electrically connected to each of the electrodes 72. When an oscillating electrical potential from an electrical signal generator is placed across conductors 74 and 76, the transducers 68 vibrate vertically in response to the electrical fields between the opposing electrode 70 and 72.

The electrodes 70 and 72 are insulated from the fluid in the print head reservoir by terminating their lower edges above the bottom surface of the stimulator means, such that the acoustical isolation material covers the electrodes 70 and 72 and electrically isolates them from fluid in the reservoir. A room temperature vulcanizing material may be used to seal the bottom surface of the material 28 from the fluid in the reservoir.

It will be appreciated that if piezoelectric transducers are utilized which vibrate in a direction parallel to the electrical field placed thereacross, electrodes 70 and 72 may be eliminated and electrodes may be positioned on the top surfaces of the transducers 68 in a fashion similar to that shown in FIG. 4. In such an arrangement, the bottom surfaces of the transducers are exposed to the fluid in the reservoir which acts as the second set of opposing electrodes. The electrical signal generator means is connected between the electrodes on the tops of the transducers and the electrically conductive manifold defining the reservoir, such that the piezoelectric material is electrically stimulated.

Figure 8:
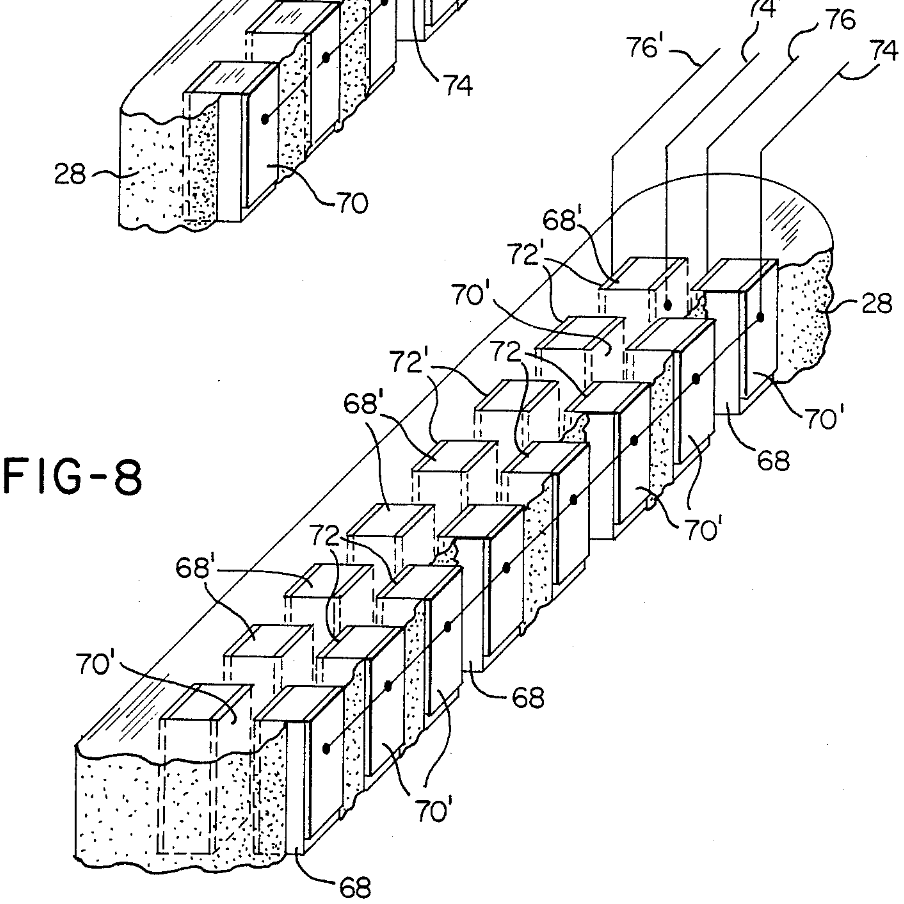
FIG. 8 is a perspective view, similar to FIG. 7, illustrating a variation of the stimulator means which may be used in the third embodiment.

Reference is now made to FIG. 8, which is a view, similar to FIG. 7, illustrating a variation in the construction of the stimulator means. Specifically, transducers 68 and 68' are positioned in a pair of transducer rows. When the stimulator means of FIG. 8 is mounted in the print head, both of the transducer rows extend generally parallel to the row of orifices. The electrical conductors 74 and 74' are electrically connected to one side of the electrical signal generator means, while the electrical conductors 76 and 76' are electrically connected to the other side of the electrical signal generator means. As a consequence, all of the transducers 68 and 68' vibrate in synchronism, producing waves in the fluid which have a substantially uniform phase front. The acoustical isolation material 28 provides a support arrangement for the transducers 68 and 68', as well as providing isolation between the transducers and the associated print head mounting structure.

Figure 9:
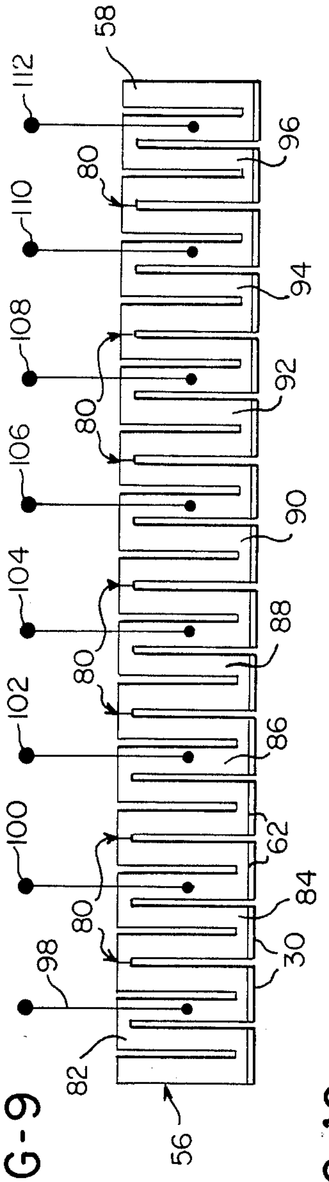
FIG. 9 is a front view of the piezoelectric means incorporated in a further embodiment of the invention.
Figure 10:
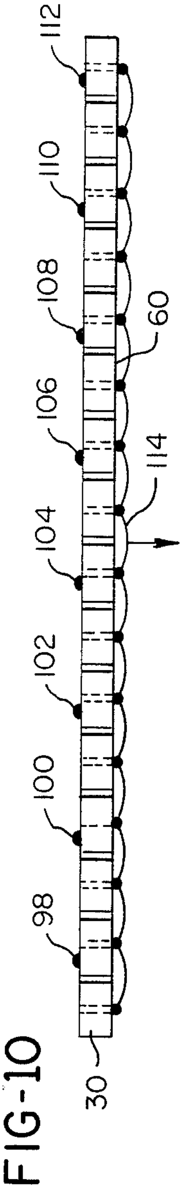
FIG. 10 is a plan view of the piezoelectric means of FIG. 9.

Reference is now made to FIGS. 9 and 10 which illustrate a stimulator means constructed in a manner similar to that of the stimulator of FIG. 6. In the stimulator arrangement of FIGS. 9 and 10, however, the electrically conductive coating 58 has been cut mechanically, or etched, at points 80. Similarly, electrically conductive coating 60 has been cut mechanically, or etched, at points along the transducer opposite points 80. The effect of this is to divide the transducer electrically into sections 82, 84, 86, 88, 90, 92, 94, and 96. These eight sections each approximately are one-half to one wavelength long and are individually connected to conductors 98, 100, 102, 104, 106, 108, 110, and 112, respectively. Although eight sections are shown for purposes of illustration, a stimulator arrangement may be constructed according to the present invention with a great many more sections. As shown in FIG. 10 an electrical conductor 114 electrically connects the sections of coating 60 together. This conductor 114 is not required, however, if cuts in the electrically conductive layer 60 are not made. In such a case, layer 60 provides a continuous electrically conductive coating along the entire length of the transducer and only a single electrical connection need be made to the coating at any point along the transducer.

Figure 11:
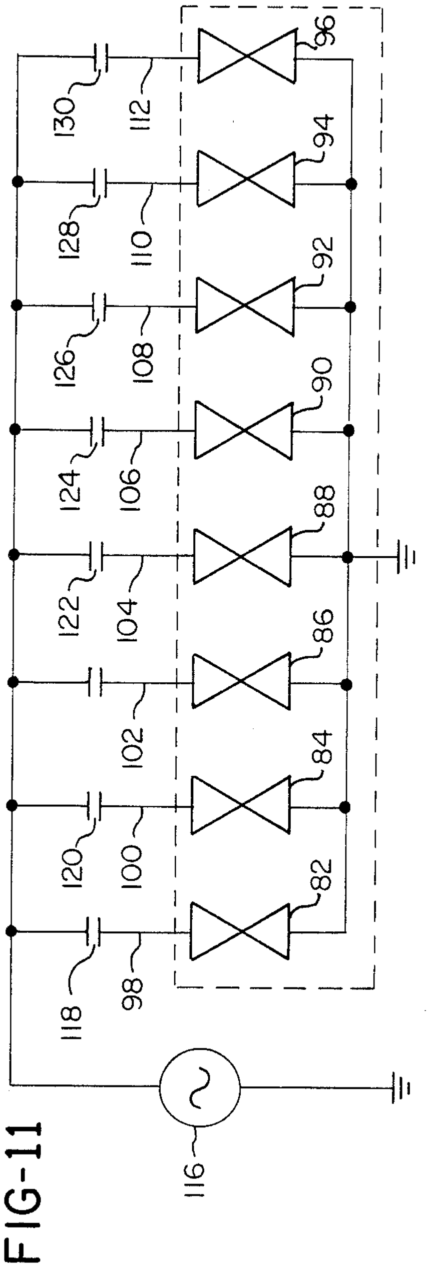
FIG. 11 is an electrical schematic diagram illustrating tuning of the piezoelectric means.

The arrangement of FIGS. 9 and 10 permits the separate sections of the transducer to be driven by a single drive signal which is selectively attenuated for the optimum driving amplitude for each such section. Such an arrangement will be utilized, typically, only when the amplitude of stimulation varies to an unacceptable degree along the length of the print head. As shown in FIG. 11, an electrical signal generator means for electrically exciting the plurality of piezoelectric means includes means 116 for providing an alternating drive signal and an attenuator means, including capacitors 118, 120, 122, 124, 126, 128, and 130, for supplying the alternating drive signal to the piezoelectric means. The amplitude of the drive signal is set for each such piezoelectric means to produce proper break up of the jet drop streams along the length of the print head.

Capacitors are utilized to attenuate the driving current since sections 82–96 are generally capacitive in nature. As a consequence, capacitors 118–130 provide relatively little phase shift in the driving current applied to the respective transducer sections.

It has been found that the values of the various capacitors needed for a specific print head may be determined experimentally in a one-pass testing procedure. The print head, including the stimulator means, is operated and a jet stream generally below a transducer section of interest is observed. The sections 82–96 are each electrically connected in series with one ohm resistors, but with no capacitive attenuation being provided. A volt meter is placed across the one ohm resistor connected to the section of interest to monitor driving current. The driving voltage across the section of interest and the one ohm resistor is varied and the drive current for the section which results in a fluid filament of minimum length and optimum break up of the jet drop stream is determined.

This operation is repeated for each of the transducer sections, with a jet drop stream roughly in the center of the transducer section being monitored for minimum filament length and optimum break off. The section of the transducer requiring the most drive current, in FIG. 11 section 86, is then operated without attenuation. The balance of the sections have capacitors inserted electrically in series to reduce the drive current to the level which was found during testing to provide optimum break off.

With respect to the height of transducers 68 and 68' in the embodiments of FIGS. 7 and 8, it is preferred that this dimension not exceed one-half wavelength, while the other two dimensions of each of the transducers should be approximately one-sixth to one-eighth wavelength. The spacing between adjacent transducers in a transducer row is preferably on the order of one-thirtieth of a wavelength. While greater spacing between adjacent transducers increases the isolation of each of the transducers, substantially greater spacing between transducers results in production of a wave in the fluid which does not have a uniform phase front. If the transducers are spaced too far apart, each transducer tends to produce separate waves which interfere with those produced by other transducers in the row.

Figure 12:
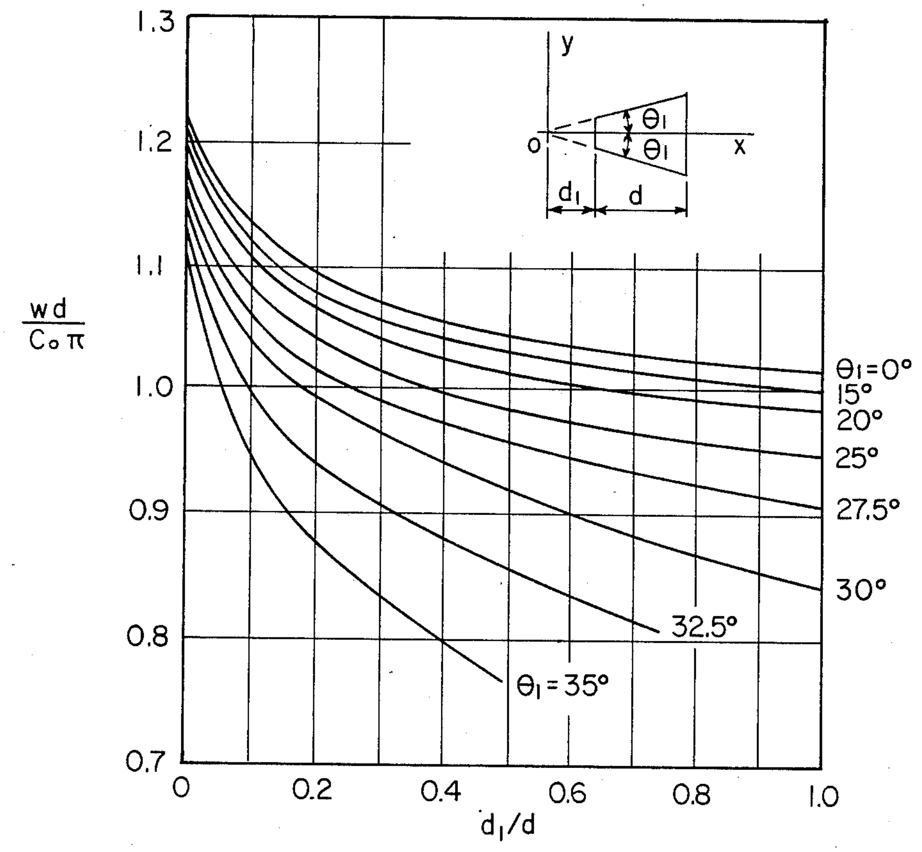
FIGS. 12–14 are graphs illustrating design considerations for a manifold cavity.
Figure 13:
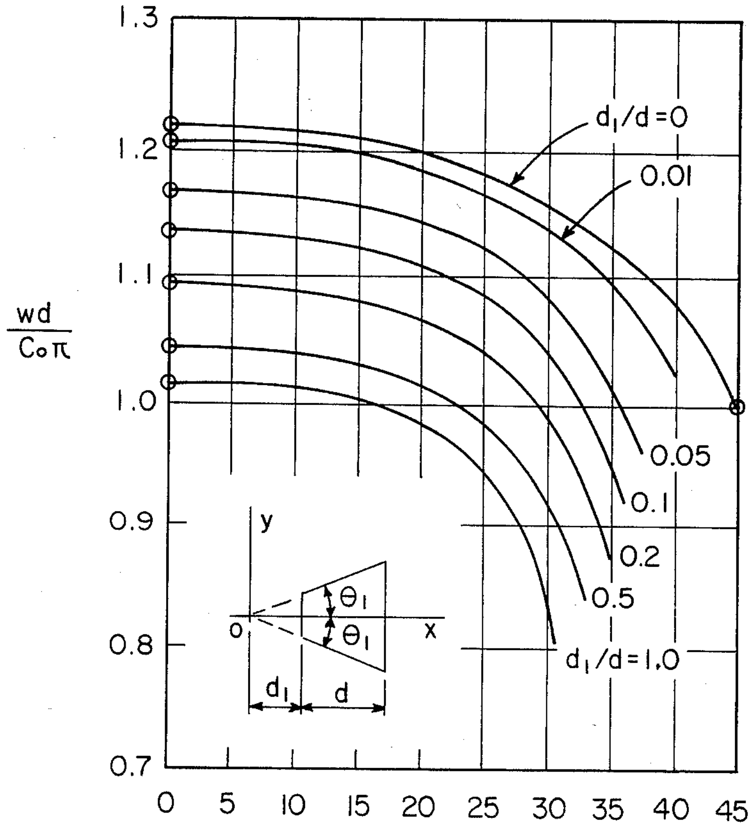
Figure 14:
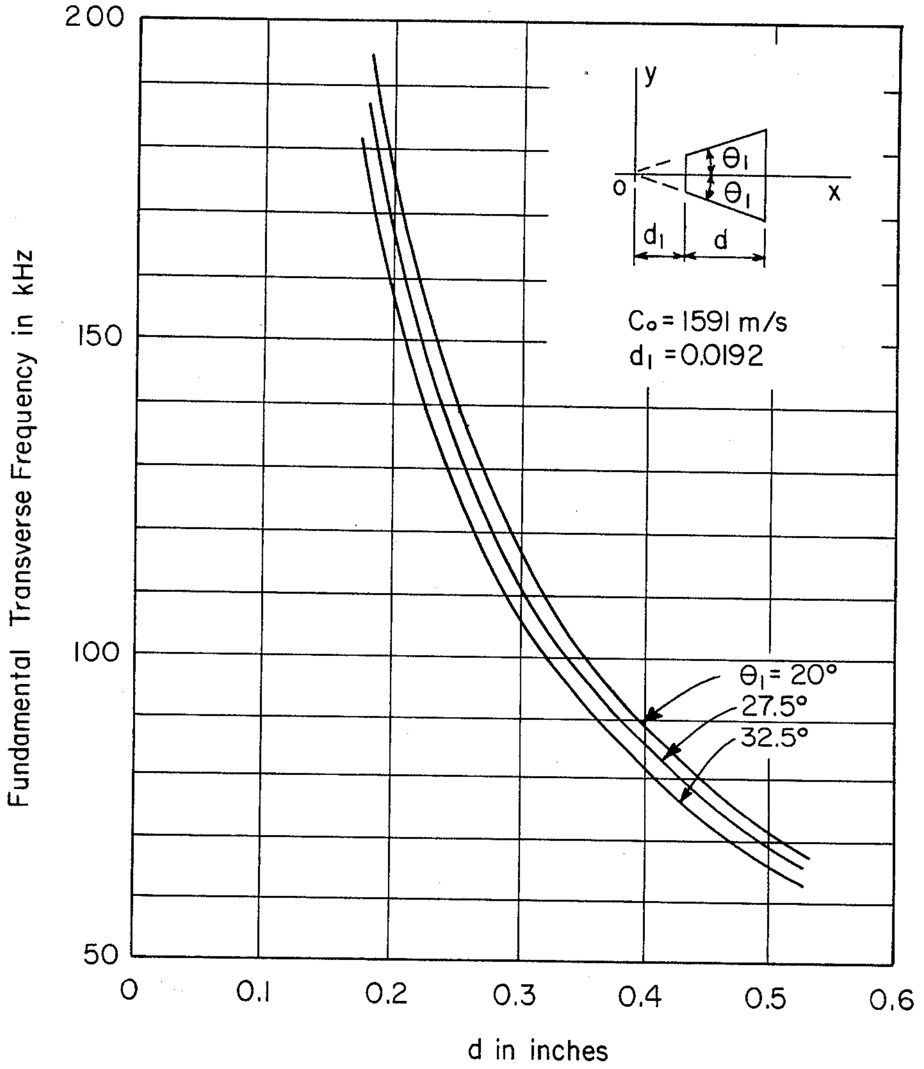

Reference is now made to FIGS. 12–14 which are graphs useful in selecting the dimensions for the fluid cavity 26, which cavity is trapezoidal in cross section as shown in FIGS. 1–3 and 5. It has been found that the fundamental transverse frequency of the cavity 26, that is the frequency of the waves passing downward from the piezoelectric transducer toward the orifice plate 20, must be selected with care relative to the resonant frequency of the stimulator 27. As a general guideline, it is considered that the cavity fundamental transverse frequency should be close to the unloaded resonant frequency of the piezoelectric transducer to obtain adequate drive efficiency and to effect uniformity of the disturbance at the orifice plate. The cavity fundamental transverse frequency and the unloaded resonant frequency of the transducer should differ in frequency, however, sufficiently such that the vibrational behavior of the piezoelectric transducer is consistent. Typically, this condition is satisfied if the cavity principal resonance is approximately 25% greater than the predetermined frequency output of the generator 29 and the unloaded resonant frequency of the transducer is approximately 10% greater than the predetermined frequency.

The cavity fundamental frequency is determined by the dimensions of the cavity cross sectional geometry.

Graphs from which preferred dimensions can be obtained are shown in FIGS. 12-14. As can be seen from these graphs, a range of dimensions satisfy the above frequency requirement. The optimum design, however, requires that the width of the trapezoidal cavity 26 at the top of the cavity, adjacent the stimulator arrangement, be substantially equal to the width C of the piezoelectric transducer. The width of the cavity adjacent the orifice plate 20, on the other hand, should be as small as possible for purposes of rigidity, typically 0.02 inches or less. The length of the cavity in its direction of elongation is preferably equal to the length of the piezoelectric transducer plus an integral multiple of the acoustic wavelength in the fluid at the predetermined frequency of stimulation. Further, the overall length of the cavity 26 in its direction of elongation should preferably not equal an integral multiple of the acoustic wavelength.

In one fluid jet print head which was constructed and operated successfully, the cavity resonance was selected as 115 KHz, with a piezoelectric transducer resonant at approximately 98 KHz and a predetermined operating frequency of 93.56 KHz. The curves of FIGS. 12-14, however, can be used to establish cavity dimensions for a frequency range generally from 90 KHz to 150 KHz. On each of the curves is a sketch of the cross section of the trapezoidal cavity, illustrating graphically the variables $d, d_1$, and $\theta_1$. FIGS. 12 and 13 also make reference to $\omega$, the operating frequency in radiance per second, and $c_0$, the velocity of sound through the fluid in the cavity (assumed to be equal to 1591 m/sec in FIG. 14).

The overall length of the piezoelectric transducer 56, in its direction of elongation, is selected to be longer than the nozzle array length by at least one acoustic wavelength through the fluid. The height A of the transducer (FIG. 4) is preferably equal to that of a simple piezoelectric transducer whose resonance is approximately 10% higher than the operating frequency. The alternate cuts which are made in the piezoelectric material are spaced apart by a distance B which is selected to be approximately 0.4 A. Similarly, thickness C of the transducer is also selected to be approximately 0.4 A.

While the forms of apparatus and the methods of making herein described constitute preferred embodiments of the invention, it is to be understood that the invention is not limited to these precise forms of apparatus, and that changes may be made therein without departing from the scope of the invention.

What is claimed is:

1. A fluid jet print head for producing a plurality of jet drop streams of fluid, comprising:

manifold means defining an elongated cavity therein, an orifice plate defining a plurality of orifices arranged in at least one row, said orifice plate being mounted on said manifold means such that said orifices communicate with said cavity and said row extends in a direction generally parallel to the direction of elongation of said cavity, stimulator means mounted in said cavity and spaced from said orifice plate so as to define a fluid reservoir therebetween, said stimulator means including a plurality of piezoelectric means which, when electrically excited, produce pressure waves of substantially uniform phase front which travel through fluid in said reservoir toward said orifice plate and which cause breakup into jet drop streams of fluid flowing through said orifices, acoustic isolation material surrounding said piezoelectric means and providing a means of supporting said piezoelectric means in said cavity, whereby wave propagation along said stimulator means in a direction parallel to said row of orifices is prevented, and electrical signal generator means for electrically exciting said plurality of piezoelectric means, said generator means including means for providing an alternating drive signal and attenuator means for supplying said alternating drive signal to said piezoelectric means with the amplitude of said drive signal being set for each piezoelectric means by said attenuator means to produce proper break up of said jet drop streams along the length of said print head.

2. The fluid jet print head of claim 1 in which said attenuator means comprises a plurality of capacitors, each of said capacitors electrically connecting said means for providing an alternating drive signal to an associated one of said piezoelectric means.

3. The fluid jet print head of claim 1 in which said plurality of piezoelectric means are defined by an elongated transducer having a plurality of slots extending alternately from opposite sides of said transducer partially therethrough and being substantially perpendicular to said row of orifices.

4. The fluid jet print head of claim 3 in which said stimulator means includes electrode means in contact with the side of said transducer adjacent said reservoir and with the opposite side of said transducer.

5. The fluid jet print head of claim 3 in which said stimulator means further comprises sealing means extending across each slot adjacent said reservoir so as to seal said slots and prevent flow of fluid from said reservoir into said slots.

6. The fluid jet print head of claim 5 in which said sealing means extends across the surface of said acoustic isolation material on the side thereof adjacent said reservoir, whereby said sealing means prevents fluid in said reservoir from contacting said acoustic isolation material.

7. The fluid jet print head of claim 1 in which said acoustic isolation material comprises a polyurethane foam material.

8. The fluid jet print head of claim 3 in which said stimulator means includes electrode means mounted on opposing surfaces of said elongated transducer, said opposing surfaces extending along the length of said transducer and substantially normal to said orifice plate.

9. The fluid jet print head of claim 8 in which said plurality of piezoelectric means are potted into place in said cavity by said acoustical isolation material, and in which said acoustical isolation material covers said electrode means, whereby said electrode means are electrically isolated from fluid in said reservoir.

10. The fluid jet print head of claim 1 in which said plurality of piezoelectric means includes a plurality of transducers arranged in at least one transducer row extending in a direction substantially parallel to said row of orifices, said transducers being uniformly spaced apart, and in which said acoustic isolation material completely surrounds each of said transducers on the sides thereof generally perpendicular to said orifice plate, whereby said transducers are acoustically isolated.

11. The fluid jet print head of claim 10 in which said stimulator means includes electrode means in contact with the side of each of said transducers adjacent said reservoir and with the opposite side thereof.

12. The fluid jet print head of claim 10 in which said stimulator means further comprises sealing means extending across the surface of said acoustic isolation material on the side thereof adjacent said reservoir, whereby said sealing means prevents fluid in said reservoir from contacting said acoustical isolation material.

13. The fluid jet print head of claim 10 in which said stimulator means includes electrode means mounted on opposing surfaces of each of said transducers, said opposing surfaces being substantially normal to said orifice plate.

14. The fluid jet print head of claim 13 in which said plurality of piezoelectric means are potted into place in said cavity by said acoustical isolation material, and in which said acoustical isolation material covers said electrode means, whereby said electrode means are electrically isolated from fluid in said reservoir.

15. The fluid jet print head of claim 10 in which said plurality of piezoelectric means include a plurality of transducers arranged in two parallel transducer rows extending in a direction substantially parallel to said row of orifices.

16. A method of electrically tuning the stimulator of a fluid jet print head of the type having a manifold defining an elongated cavity, an orifice plate mounted on the manifold and defining a plurality of orifices arranged in at least one row, and a stimulator means mounted in the cavity and including a plurality of piezoelectric means which, when electrically excited, produce pressure waves of substantially uniform phase front which travel through the fluid in the reservoir and cause break up of fluid flowing through the orifices into jet drop streams, comprising the steps of:

(a) applying a drive signal to all of said piezoelectric means, (b) monitoring the fluid filament length of a jet closest to the first of said piezoelectric means while adjusting the current supplied thereto in order to determine the optimum current level to be applied to said first of said piezoelectric means, (c) repeating step (b) for each of the remaining piezoelectric means, and (d) connecting impedances of appropriate amplitudes in series with each of said piezoelectric means such that said piezoelectric means may be driven by a single drive signal source with each of said piezoelectric means receiving its respective optimum current level.

17. The method of claim 16 in which said step of connecting impedances includes the step of connecting a capacitor of a desired impedance in series with each of said piezoelectric means.

18. A fluid jet print head for producing a plurality of jet drop streams of fluid at a predetermined frequency, comprising:

manifold means defining an elongated cavity therein, said cavity being dimensioned not to be equal in its direction of elongation to an integer multiple of the wavelength of waves of the predetermined frequency through the fluid, an orifice plate defining a plurality of orifices arranged in at least one row, said orifice plate being mounted on said manifold means such that said orifices communicate with said cavity and said row extends in a direction generally parallel to the direction of elongation of said cavity, stimulator means mounted in said cavity and spaced from said orifice plate so as to define a fluid reservoir therebetween, said stimulator means including a plurality of piezoelectric means which, when electrically excited, produce pressure waves of substantially uniform phase front which travel through fluid in said reservoir toward said orifice plate and which cause breakup into jet drop streams of fluid flowing through said orifices, said piezoelectric means being defined by an elongated transducer having a plurality of slots extending alternately from opposite sides of said transducer partially therethrough and being substantially perpendicular to said row of orifices, said transducer being at least approximately one wavelength in length less than the length of said elongated cavity and greater in length than said row of orifices, acoustic isolation material surrounding said piezoelectric means and providing a means of supporting said piezoelectric means in said cavity, whereby wave propagation along said stimulator means in a direction parallel to said row of orifices is prevented, and electrical signal generator means for electrically exciting said plurality of piezoelectric means, said generator means including means for providing an alternating drive signal at said predetermined frequency, and attenuator means for supplying said alternating drive signal to said piezoelectric means with the amplitude of said drive signal being set for each piezoelectric means by said attenuator means to produce proper break up of said jet drop streams along the length of said print head.

19. The fluid jet print head of claim 18 in which said attentuator means comprises a plurality of capacitors, each of said capacitors electrically connecting said means for providing an alternating drive signal to an associated one of said piezoelectric means.

20. The fluid jet print head of claim 18 in which said transducer is less than the length of said elongated cavity by approximately an integer multiple wavelength of waves of the predetermined frequency through the fluid.

21. The fluid jet print head of claim 18 in which said cavity is trapezoidal in cross sectional shape taken in a plane substantially normal to the direction of elongation, and in which said cavity has a fundamental resonant frequency greater than said predetermined frequency.

22. The fluid jet print head of claim 21 in which said fundamental resonant frequency of said cavity is approximately 25% greater than said predetermined frequency.

23. The fluid jet print head of claim 18 in which said transducer is at least one wavelength in length greater than the length of said row of orifices.

24. The fluid print head of claim 18 in which said row of orifices and said transducer are positioned symmetrically with respect to said cavity.

25. The fluid jet print head of claim 18 in which said transducer is of a height, in a direction normal to said orifice plate, which is equal to the height of a simple length expander which has a resonant frequency approximately 10% greater than said predetermined frequency.

26. The fluid jet print head of claim 18 in which the thickness of said transducer, in a direction normal to said height and to the direction of elongation, is approximately equal to two-fifths of the height of said transducer.

27. A fluid jet print head for producing a plurality of jet drop streams of fluid at a predetermined frequency, comprising:

manifold means defining an elongated cavity therein, said cavity being dimensioned not to be equal in its direction of elongation to an integer multiple of the wavelength of waves of the predetermined frequency through the fluid, an orifice plate defining a plurality of orifices arranged in at least one row, said orifice plate being mounted on said manifold means such that said orifices communicate with said cavity and said row extends in a direction generally parallel to the direction of elongation of said cavity, and stimulator means mounted in said cavity and spaced from said orifice plate so as to define a fluid reservoir therebetween, said stimulator means including a plurality of piezoelectric means, defined by an elongated transducer having a plurality of slots extending alternately from opposite sides of said transducer partially therethrough and being substantially perpendicular to said row of orifices, said transducer being at least approximately one wavelength in length less than the length of said elongated cavity and greater in length than the length of said row of orifices, said piezoelectric means, when electrically excited, producing pressure waves of substantially uniform phase front which travel through fluid in said reservoir toward said orifice plate and which cause breakup into jet drop streams of fluid flowing through said orifices, and acoustic isolation material surrounding said piezoelectric means and providing a means of supporting said piezoelectric means in said cavity, whereby wave propagation along said stimulator means in a direction parallel to said row of orifices is prevented.

28. The fluid jet print head of claim 27 in which said transducer is less than the length of said elongated cavity by approximately an integer multiple wavelength of waves of the predetermined frequency through the fluid.

29. The fluid jet print head of claim 27 in which said cavity is trapezoidal in cross-sectional shape taken in a plane substantially normal to the direction of elongation, and in which said cavity has a fundamental resonant frequency greater than said predetermined frequency.

30. The fluid jet print head of claim 29 in which said fundamental resonant frequency of said cavity is approximately 25% greater than said predetermined frequency.

31. The fluid jet print head of claim 27 in which said transducer is at least one wavelength in length greater than the length of said row of orifices.

32. The fluid jet print head of claim 27 in which said row of orifices and said transducer are positioned symmetrically with respect to said cavity.

33. The fluid jet print head of claim 27 in which said transducer is of a height, in a direction normal to said orifice plate, which is equal to the height of a simple length expander which has a resonant frequency approximately 10% greater than said predetermined frequency.

34. The fluid jet print head of claim 33 in which said slots are spaced along said transducer, in a direction parallel to said direction of elongation, by a distance approximately equal to two-fifths of the height of said transducer.

35. The fluid jet print head of claim 33 in which the thickness of said transducer, in a direction normal to said height and to the direction of elongation, is approximately equal to two-fifths of the height of said transducer.

36. The fluid jet print head of claim 30 in which the trapezoidal cross-sectional shape of said cavity is tapered toward said orifice plate and is approximately 0.02 inches or less, whereas the opposite wall of said cavity is dimensioned to approximately equal the thickness of said transducer.

37. A fluid jet print head for producing a plurality of jet drop streams of fluid at a predetermined frequency, comprising, manifold means defining an elongated cavity therein, said cavity extending in its direction of elongation a distance not equal to an integer multiple of the wavelength of pressure waves through the fluid at the predetermined frequency, an orifice plate, defining a plurality of orifices arranged in a row and mounted on the manifold means such that said orifices communicate with said cavity, and stimulator means mounted in said cavity and spaced from said orifice plate, said stimulator means including a piezoelectric transducer which is elongated generally in the direction of elongation of said cavity, said transducer defining a plurality of slots which extend alternately from the side of said transducer facing said orifice plate and from the opposite side of said transducer partially therethrough and spaced along said transducer, said slots being in planes substantially perpendicular to said orifice plate and to the direction of elongation of said transducer, and said transducer extending a distance in its direction of elongation which is at least one wavelength greater than the length of said row of orifices.

38. The fluid jet print head of claim 37 in which said cavity extends in its direction of elongation a distance which is an integer wavelength distance greater than the dimension of said transducer in its direction of elongation.

39. The fluid jet print head of claim 38 in which said stimulator means further includes acoustic isolation material surrounding said piezoelectric transducer and providing a means of supporting said piezoelectric transducer in said cavity to provide isolation of said manifold from said piezoelectric transducer.

* * * * *